United States Patent
Martinelli

(10) Patent No.: US 9,973,509 B2
(45) Date of Patent: *May 15, 2018

(54) PROVISIONING SYSTEM-LEVEL PERMISSIONS USING ATTRIBUTE-BASED ACCESS CONTROL POLICIES

(71) Applicant: AXIOMATICS AB, Stockholm (SE)

(72) Inventor: Andres Martinelli, Stockholm (SE)

(73) Assignee: AXIOMATICS AB, Stockholm (SE)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/400,388

(22) Filed: Jan. 6, 2017

(65) Prior Publication Data

US 2017/0126687 A1    May 4, 2017

Related U.S. Application Data

(63) Continuation of application No. 14/546,018, filed on Nov. 18, 2014.

(30) Foreign Application Priority Data

Sep. 5, 2014  (EP) ..................................... 14183845

(51) Int. Cl.
   *G06F 17/00*   (2006.01)
   *H04L 29/06*   (2006.01)
   *G06F 21/60*   (2013.01)

(52) U.S. Cl.
   CPC .......... *H04L 63/101* (2013.01); *G06F 21/604* (2013.01); *G06F 2221/2141* (2013.01)

(58) Field of Classification Search
   CPC ... H04L 63/20; H04L 63/102; H04L 63/0227; G06F 21/6218; G06F 21/604

(Continued)

(56) References Cited

U.S. PATENT DOCUMENTS 6,647,388 B2  11/2003  Numao et al.
6,757,680 B1   6/2004  Choy
(Continued)

FOREIGN PATENT DOCUMENTS

EP   1 308 823 A2   5/2003
EP   2 169 587 B1   3/2010
(Continued)

OTHER PUBLICATIONS

Vincent C. Hu et al., Guide to Attribute Based Access Control (ABAC) Definition and Considerations, NIST Special Publication-tion 800-162, (46 pages).

(Continued)

*Primary Examiner* — Evans Desrosiers
(74) *Attorney, Agent, or Firm* — Buchanan Ingersoll & Rooney P.C.

(57) ABSTRACT

A permissions provisioning module includes a data adapter and a permissions calculator associated with a policy evaluator operable to evaluate an ABAC policy. The module is adapted to interact with a computer system including resources, metadata and an access control mechanism enforcing, in respect of each resource, an access control list associated with the resource. In operation, the data adapter receives metadata for said computer system and assigns values to attributes in the policy based on the metadata. The permissions calculator queries the policy evaluator on combinations of resources and principals of the system using the attribute values thus assigned, and returns permission data. The data adapter formats said permission data into ACLs, for deployment in the computer system.

13 Claims, 2 Drawing Sheets

(58) Field of Classification Search
USPC ......... 713/168–174, 182–186, 202; 709/206, 709/225, 229, 249, 389, 1–21; 726/1–21
See application file for complete search history.

(56) References Cited

U.S. PATENT DOCUMENTS

| | | | |
|---|---|---|---|
| 6,880,005 | B1 | 4/2005 | Bell et al. |
| 7,243,097 | B1 | 7/2007 | Agrawal et al. |
| 7,281,003 | B2 | 10/2007 | Lei et al. |
| 7,478,419 | B2 | 1/2009 | Anderson et al. |
| 7,747,647 | B2 | 6/2010 | Canning et al. |
| 7,779,057 | B2 | 8/2010 | Betts et al. |
| 7,779,247 | B2 | 8/2010 | Roegner |
| 7,814,492 | B1 * | 10/2010 | Creemer ............... G06F 9/5061 709/226 |
| 7,856,652 | B2 | 12/2010 | Hieda |
| 7,921,452 | B2 | 4/2011 | Ridlon et al. |
| 8,010,991 | B2 | 8/2011 | Sarukkai et al. |
| 8,024,771 | B2 | 9/2011 | Malkin et al. |
| 8,056,114 | B2 | 11/2011 | Allen et al. |
| 8,122,484 | B2 | 2/2012 | Karjoth et al. |
| 8,156,537 | B2 | 4/2012 | Gomez et al. |
| 8,250,526 | B2 | 8/2012 | Anderson et al. |
| 8,271,418 | B2 | 9/2012 | Allen et al. |
| 8,332,359 | B2 | 12/2012 | Kreuch et al. |
| 8,381,306 | B2 | 2/2013 | McPherson et al. |
| 8,434,125 | B2 | 4/2013 | Ramesh et al. |
| 8,458,764 | B2 | 6/2013 | Karjoth et al. |
| 8,543,606 | B2 | 9/2013 | Pulfer et al. |
| 8,560,836 | B2 | 10/2013 | Roegner |
| 8,601,549 | B2 | 12/2013 | Dickerson |
| 8,667,556 | B2 | 3/2014 | Chang et al. |
| 8,805,881 | B2 | 8/2014 | Hom et al. |
| 8,826,366 | B2 | 9/2014 | Narain et al. |
| 2003/0088786 | A1 * | 5/2003 | Moran ............... G06F 21/6218 726/4 |
| 2005/0166260 | A1 | 7/2005 | Betts et al. |
| 2006/0041666 | A1 | 2/2006 | Karremans |
| 2006/0230282 | A1 | 10/2006 | Hausler |
| 2007/0056019 | A1 | 3/2007 | Allen et al. |
| 2009/0077621 | A1 | 3/2009 | Lang et al. |
| 2009/0205018 | A1 | 8/2009 | Ferraiolo et al. |
| 2009/0265780 | A1 | 10/2009 | Korkus et al. |
| 2010/0153695 | A1 | 6/2010 | Bussard et al. |
| 2010/0299738 | A1 | 11/2010 | Wahl |
| 2013/0036447 | A1 | 2/2013 | Lassesen |
| 2013/0239171 | A1 | 9/2013 | Ramesh et al. |
| 2014/0310254 | A1 | 10/2014 | Hom et al. |

FOREIGN PATENT DOCUMENTS

| | | |
|---|---|---|
| EP | 2 681 690 B1 | 7/2014 |
| WO | WO 2012/091653 A1 | 7/2012 |

OTHER PUBLICATIONS

OASIS eXtensible Access Control Markup Language (XACML) Version 3.0, Jan. 22, 2013, pp. 1-154.

Jahid, et al., "My ABDAC: Compiling XACML Policies for Attribute-Based Database Access Control", CODASPY '11, Feb. 21, 2011, vol. 23, XP055171228. (12 pages).

Jahid, et al., "My ABDAC: Compiling XACML Policies for Attribute-Based Database Access Control" 1st ACM Conference on Data and Application Security and Privacy (CODASPY) 2011, Feb. 11, 2011; XP 055171231. (24 pages).

Hafeez, et al., "Interoperability Among Access Control Models", Multitopic Conference (INMIC), 2012 15th International, IEEE, Dec. 13, 2012, XP032398044. (8 pages).

European Search Report dated Feb. 26, 2015, by the European Patent Office in corresponding European Patent Application No. 14 18 3845. (6 pages).

Office Action (Communication pursuant to Article 94(3) EPC) dated Apr. 4, 2018 by the European Patent Office in corresponding European Patent Application No. 14 183 845 .8-1213. (7 pages).

* cited by examiner

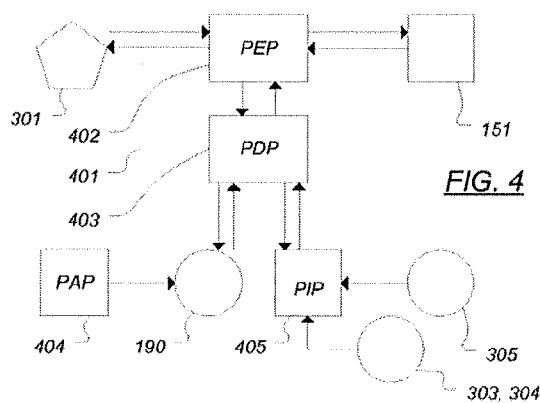
FIG. 4
| ACL | | | |
|---|---|---|---|
| | r | w | d |
| P1 | Y | Y | Y |
| P2 | Y | Y | N |
| P3 | Y | - | N |
| P4 | Y | N | N |
| P5 | N | N | N |
FIG. 2
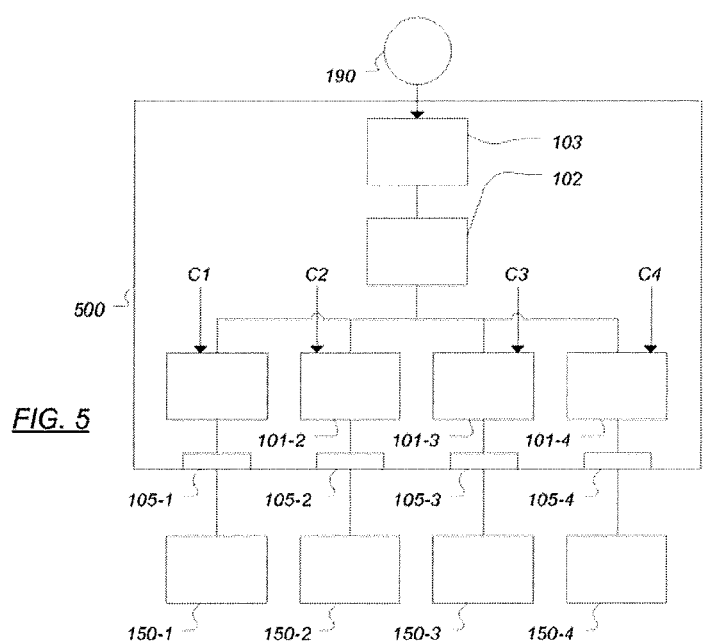
FIG. 5

PROVISIONING SYSTEM-LEVEL PERMISSIONS USING ATTRIBUTE-BASED ACCESS CONTROL POLICIES

CROSS REFERENCE TO RELATED APPLICATIONS

The present application is a continuation of U.S. application Ser. No. 14/546,018, filed on Nov. 18, 2014, which claims the benefit of European Application No. 14183845.8, filed on Sep. 5, 2014. The entire contents of U.S. application Ser. No. 14/546,018 and European Application No. 14183845.8 are hereby incorporated herein by reference in their entirety.

TECHNICAL FIELD

The invention disclosed herein generally relates to the field of automated access control and authorization. In particular, it relates to an architecture and methods for provisioning permissions, in particular access control lists (ACLs), governing access control mechanisms in a computer system.

BACKGROUND

On a high level, attribute-based access control (ABAC) may be defined as a method where a subject's requests to perform operations on resources are granted or denied based on assigned attributes of the subject, assigned attributes of the resource, environment conditions, and a set of one or more policies that are specified in terms of those attributes and conditions. Here, attributes are characteristics of the subject, resource, or environment conditions. Attributes contain information given by a name-value pair. A subject is a human user or non-person entity, such as a device that issues access requests to perform operations on resources. Subjects are assigned one or more attributes. A resource (or object) is a system resource for which access is managed by the ABAC system, such as devices, files, records, tables, processes, programs, networks, or domains containing or receiving information. It can be the resource or requested entity, as well as anything upon which an operation may be performed by a subject including data, applications, services, devices, and networks. An operation is the execution of a function at the request of a subject upon a resource. Operations include read, write, edit, delete, copy, execute and modify. Environment conditions describe an operational or situational context in which an access request occurs. Environment conditions are detectable environmental characteristics. Environmental characteristics are generally independent of subject or resource, and may include the current time, day of the week, location of a user, or the current threat level. Finally, policy is the representation of rules or relationships that makes it possible to determine if a requested access should be allowed, given the values of the attributes of the subject, resource, and possibly environment conditions. A policy may be expressed as a logical function, which maps an access request with a set of attribute values (or references to attribute values) to an access decision (or an indication that the request has not returned a decision).

An ABAC authorization scenario is depicted in FIG. 3. In step 1, a user (or subject) 301 requests access to a resource 151 through the intermediary of an ABAC mechanism 302 which selectively protects access to the resource 151. The ABAC mechanism 302 forms a decision by retrieving, in step 2a-2b-2c-2d, applicable rules R1, R2, R3 from a policy repository 190, subject attributes (e.g. name, affiliation, clearance) from a subject attribute data source 303, resource attributes (e.g. type, owner, classification) from a resource attribute data source 304, and environment conditions expressed as environment attribute values from an environment attribute data source 305. If the ABAC mechanism 302 is able to determine that the decision is to permit access, it will take appropriate measures to grant the user 301 access to the resource 151, e.g. by selectively deactivating a hardware or software protection means. Otherwise, access to the resource 151 may be denied.

There currently exist general-purpose ABAC policy languages that have the richness to express fine-grained conditions and conditions which depend on external data. A first example is the Extensible Access Control Markup Language (XACML) which is the subject of standardization work in a Technical Committee of the Organization for the Advancement of Structured Information Standards (OASIS, 35 Corporate Drive Suite 150, Burlington, Mass. 01803-4238, USA). A policy encoded with XACML consists of declarative (in particular, functional) expressions in attribute values, and the return value (decision) of the policy is one of Permit, Deny, Not Applicable, or Indeterminate. An XACML policy can apply to many different situations, that is, different subjects, resources, actions and environments and may give different results for them. The XACML specification defines how such a request is evaluated against the policy, particularly what policy attributes are to be evaluated or, at least, which values are required to exist for a successful evaluation to result. A key characteristic of this evaluation process is that the request must describe the attempted access to a protected resource fully by containing information sufficient for all necessary attribute values to be retrieved. In practice, it may be that the request is interpreted in multiple stages by different components, so that a PEP (Policy Enforcement Point) issuing the requests provides only some attribute values initially, and a PDP (Policy Decision Point) or other component responsible for the evaluation can dynamically fetch more values from remote sources as they are needed. A second example is the Axiomatics Language For Authorization', which the applicant provides.

XACML-based solutions typically offer "authorization as a service", wherein a PEP in a target application/system captures access requests in real time and sends them to a PDP for evaluation against a current version one or more XACML policies. Such externalized authorization approach ensures continuity in that it drastically reduces or eliminates the latency between an update of the policy and actual enforcement of the new rules therein.

In practice, however, many organizations operate computer systems for which there are currently no PEP components available, and whose authorization mechanisms are built around other models than ABAC. In the category of non-externalized non-ABAC authorization models, there is a practice of associating each resource in the system with a record naming principals of the system and the actions they are entitled to perform on the resource. As used herein, a principal may be a user (person or non-person entity) or a group of users. It is common practice to require authentication of users of a system with access control of this type; the authentication may be performed in connection with a login procedure. Principals may be non-distinct, in that a given user may be defined as a principal on its own or may be included in one or more groups; it is the responsibility of the system administrator to assign access rights in a manner that avoids inconsistencies and/or to define precedence rules (e.g. "first applicable", "deny overrides", "permit overrides") suitable for reconciling any contradictory access decisions stemming from a user's ability to act as more than one principal in the system. With this in place, it is typically possible to treat all principals in a uniform manner irrespective or their status as single users or groups. The records naming principals and their corresponding access rights to a resource, in non-ABAC authorization models, are commonly referred to as access control lists (ACLs). ACLs may be stored in a central or distributed memory in the computer system together with an indication of the resource(s) to which they refer. One ACL may be applicable in respect of more than one resource; inheritance between hierarchically ordered resources (e.g. folder-subfolder-file) is widely practiced as well. The rights defined by an ACL are enforced by an access control mechanism taking measures to restrict or facilitate a principal's access, as required by the ACL, to a resource. In different system architectures, the access control mechanism may relate to separate components of the computer system (e.g. access control module interposed between a user interface and a protected resource) or may be integrated into components with additional responsibilities (e.g. a database interface configured to reply only to such queries that have passed an authorization test against an applicable ACL). ACLs have been used as one way to implement so-called role-based access control (RBAC).

One limitation of ACL-based authorization is that certain policies are impossible to express as regular ACLs, e.g. policies which refer to resource metadata other than the resource identity. In particular, rules based on conditions on the current location of the principal relative to the location of the resource cannot be satisfactorily expressed as standard ACLs, unless a principal is assumed to be always in the same location. Calendar dependencies represent a further challenging class of conditions; attempts to overcome this limitation include scheduled recalculation of existing user sessions, whereby a users may be regrouped as different principals, which may however be a solution less appreciated by users of the computer system.

A further limitation is the scaling problems of policies expressed as ACLs. A desired increase in one of principal count, resource count or policy complexity typically happens at a significant cost increase in terms of storage space and processing power, and may lead to the access control mechanism consuming a larger share of the available storage and processing capacity in the system. There is an inherent trade-off between policy complexity on the one hand, and increased security risk and maintenance cost on the other. The enforcement of too complex policies is rendered infeasible by the burden of maintaining the ACLs and of reorganizing resources for access control purposes (e.g. arranging files with similar access rights in a common folder to exploit inheritance), particularly for large sets of resources. Tools for maintaining distributed ACLs, such as specialized scripts and schedulers, have been proposed to help system administrators spend less time on ACL maintenance; by their ad hoc nature, these tools may however be less reliable than the proprietary access control mechanism of the system (e.g. by lacking a systematic testing and verification history) and could therefore put the overall reliability of the access control functionality in jeopardy.

SUMMARY

It is in view of the above limitations and inconveniences that the present invention has been made. The invention has been conceived as a way to provision or maintain access rights in a computer system including a plurality of resources (in the sense already defined) and intended to be used by principals, which may submit requests to access the resources. Each resource is associated with an ACL, which may be uniquely assigned or may be common to more than one resource. The ACL may be stored in a dedicated memory or memory space associated with the resource to which it pertains, or may alternatively be located in a centralized memory storing a collection of ACLs for different resources. A memory in the computer system stores system metadata including metadata associated with the resources and/or metadata associated with the principals. It is understood that this memory may be distributed; it is a memory with at least a read ability, in the sense that system metadata associated with a given resource may be obtained by submitting a query to this resource, e.g. a query asking for the hardware type or release of the resource. In the computer system, an access control mechanism operates to selectively restrict principals' access to a resource in accordance with its associated ACL.

In an example embodiment, a permissions provisioning module is configured to interact with the computer system. In particular, the permissions provisioning module is operable to receive the system metadata from the computer system (directly or through an intermediary, such as a cache memory storing a snapshot of the system metadata) and to return ACLs for deployment in the system, which have been generated in accordance with an ABAC policy containing access rules expressed in terms of attributes. The permissions provisioning module comprises a permissions calculator, which is communicatively connected to a data adapter and a policy evaluator.

The policy evaluator is configured to evaluate an access query against the ABAC policy, which the policy evaluator is able to retrieve, either by a call to a remote policy repository or by accessing a locally stored policy description. The access query may be a normal request for an access decision, e.g. Permit or Deny, based on a collection of attribute values sufficient to evaluate the policy; alternatively, the access query may be a reverse query which includes a sought-for decision together with a non-complete attribute value collection (i.e. insufficient to complete the evaluation against the policy), and having as its expected response those values, if any, of the remaining attributes that would yield the sought-for decision.

Still within the permissions provisioning module, the data adapter is configured to receive the system metadata and assign values to said attributes in the ABAC policy in accordance with the metadata. It is understood that the identities of the resources and the identities of the principals for which provisioning is possible are derivable (or detectable) from the system metadata. For instance, the system metadata pertaining to resources may be conveyed by a data structure allowing all metadata entries pertaining to a specific resource to be retrieved jointly, collected or gathered. By traversing all received metadata items, the data adapter will be able to establish a finite collection of resources in the computer system. The identities of all principals susceptible of appearing in the ACLs produced by the permissions provisioning module may be derived from the system metadata in a similar manner. Preferably, the data adapter is configured to produce the attribute values arranged by resource or arranged by principal, as applicable. Again this may amount to arranging the values according to a data structure allowing each attribute value of a specific resource or a specific principal to be retrieved jointly, e.g. to form an access request pertaining to a combination of the specific resource and the specific principal.

Furthermore, the permissions calculator is configured to query the policy evaluator on combinations of resources and principals. Each such query is submitted to the policy evaluator as an access decision request including the attribute values of the resource in question and of the principal in question. Optionally, environment and/or action attribute values may be included in the access decision request. The permissions calculator supplies the resulting permission data (e.g. access decisions) back to the data adapter. The data adapter is configured to collect all such permission data for each detected resource by generating an ACL for the resource. The ACL is then supplied in system-readable format for deployment in the computer system.

After the ACLs produced by the permissions provisioning module have been deployed in the computer system, it will be in a state such that the access control behaviour in the computer system will correspond to the behaviour described by the ABAC policy in the version accessed by the policy evaluator. It is evident that an update of the ABAC policy will have immediate effect on the ACLs produced (although it may be convenient, in the interest of internal consistency, to ignore policy updates taking place while a new round of provisioning is in progress). Apart from the interface with the computer system (e.g. receiving system metadata and generating system-readable ACLs), the architecture outlined above is general and system-independent and is therefore suitable for mass production, which typically lends itself to verification up to higher reliability standards than custom-made solutions may. The permissions provisioning module and architecture of which it forms part are moreover independent of the content of the access rules in the ABAC policy, hence has proved to be a versatile and easily adaptable structure.

An advantage of the permissions provisioning module and its way of interacting with the computer system is that it enhances the flexibility in defining access rules beyond the capabilities offered by ACL-based access control as conventionally practised. For instance, the access rules may now include dependencies on calendar time, dependencies on environment variables (environment attributes), and/or dependencies on resource attributes other than identity. This makes it possible to implement more fine-grained access control in an existing ACL-based infrastructure.

A further advantage that may be associated with the permissions provisioning module is that maintenance of the ACLs in the computer system may be initiated as a result of modifying policy content in declarative language. As mentioned, prior art approaches to automated ACL maintenance involve executing scripts defined in imperative language, both on a higher level, e.g. defining points in time at which maintenance is to take place, and on a lower level, e.g. moving files to new locations to exploit inheritance, or performing specific changes to the ACLs, such as adding, deleting or replacing principals and their corresponding access rights. In sum, since the governing ABAC policy is not encoded inside the computer system, the invention facilitates externalization of access control. It allows for declarative, centralized, automatic and continuous management of the ACLs governing the access control mechanism in the computer system.

Yet another advantage is that the generated ACLs are in a final form. Some prior art solutions may be implemented by a rule engine, such as an event-condition-action (ECA) structure, in which an access rule may trigger generation of an amendment action to be taken in respect of a corresponding ACL. If this approach is local or near-sighted (e.g. dealing with one access rule or a low number of access rules at a time), it may result in sequences of mutually cancelling add and remove actions. In contrast, the approach according to the above example embodiment uses complete access decisions, obtained by evaluating access requests against the governing ABAC policy, as a basis for the permission data that are turned into ACLs.

It is noted that the most generic embodiments of the invention are not primarily aimed at optimizing the configuration of principals. They typically do not require the permissions provisioning module to have powers to modify the configuration of principals. As such, the permissions provisioning module generally is not configured to look for opportunities to join two principals, to omit a principal that is redundant, or the like, but accepts the set of principals as they are defined in the computer system and provisions the ACLs in terms of these principals.

In an example embodiment, the resources in the computer system are one or more of the following: devices, files, records, tables, processes, programs, networks, domains containing or receiving information. In particular, the resources may relate to securable objects other than documents, or securable objects other than files. In an example embodiment, the computer system is one or more of the following: a general-purpose file management system; a document management system; a content management system, a financial system; a communications system; an industrial control system; an administrative system; an enterprise system; a simulations system; a computational system; an entertainment system, an educational system; a defence system.

In an example embodiment, the permissions provisioning module further comprises a scheduler with powers to control at least one of the data adapter and the permissions calculator, so that the scheduler is operable to initiate a round of provisioning. A round of provisioning may include generating a complete set of new or updated ACLs for all resources in the computer system. Alternatively, a round of provisioning may include providing a partial set of ACLs, e.g. ACLs pertaining to resources only in a designated subportion of the computer system or only ACLs that have been updated since the most recent round of provisioning.

Specifically, the scheduler may be event-driven in the sense that it initiates a round of provisioning in response to a predefined, detectable event. In general terms, the event may either be such that it makes at least part of the currently deployed ACLs obsolete or inconsistent, or such that it allows for convenient retrieval of a consistent snapshot of all system metadata and/or for convenient deployment of the generated ACLs, as may be the case when the computer system is out of service. Examples of such events that may trigger complete or partial (re)provisioning include: update of the ABAC policy, from which the policy evaluator retrieves access rules; addition of a new principal in the system; addition of a new resource; change in environment data describing a current state of the computer system and affecting significant environment attributes; beginning of significant planned maintenance undertaken on the computer system; beginning of significant unplanned outage in the computer system; or combinations of two or more of these. The scheduler may be made aware of such events either by polling the computer system or by receiving notifications from the computer system.

A specific example of triggering events is permission changes occurring during workflows defined in the framework of a document management platform (such as Microsoft SharePoint™), wherein a document may successively be released to more and more principals (i.e. down-authorizations) as it passes stages of a review process in the workflow. A down-authorization is a change in a property of the document, hence a change in resource metadata. In the interest of avoiding annoying waiting times that might obstruct the workflow, it may be advantageous to configure the scheduler to detect such resource metadata changes pertaining to documents that are the subject of active workflows; concretely, a detected change of this type may be set to trigger immediate reprovisioning of an ACL associated with the document.

Alternatively or additionally, the scheduler is calendar-driven in the sense that it initiates (re)provisioning at pre-defined points in time (date, clock time) and/or at predetermined intervals. The occasions on which (re)provisioning is performed may correspond to points in time at which time-dependent access rules change their behaviour; for instance, if an access rule allows different usage of a printer during office hours and outside office hours, reprovisioning (at least in respect of the printer) may be scheduled to take place at the beginning and end of office hours. It is noted that this example embodiment allows for causing an otherwise role-based access control mechanism (i.e. expressed in terms of ACLs) to enforce time-dependent access rules. In further developments of this example embodiment, the scheduler may be configured to analyze the access rules of the ABAC policy for time-dependencies, and schedule (re)provisioning at adequate points in time based on the result. Such automatic scheduling ensures that the permissions provisioning module is policy-independent, in the sense that it operates accurately after a change of the substance of the ABAC policy also in the absence of reconfiguration initiated by an administrator.

It is moreover envisioned that the scheduler may be configured to initiate (re)provisioning in response to a combination of event-based and calendar-based criteria. For instance, in a computer system with high average load, a change effected to the ABAC policy may trigger reprovisioning on a condition that it occurs outside office hours; for a computer system where latency is to be avoided, a change may trigger immediate reprovisioning on a condition that it occurs during office hours, and otherwise the policy change may be processed together with other changes in the early morning in the interest of efficiency and conservation of processing power.

In an example embodiment, the scheduler may be operable to initiate incremental provisioning. In this embodiment, when the scheduler becomes aware (e.g. by actively polling or being notified) of a change in system metadata or a change in the ABAC policy to which the policy evaluator refers, it determines which ACLs will potentially be affected by the change or obtains this information by a call to a different process or section of the permissions provisioning module. As an equivalent alternative, the scheduler may determine or obtain a list of those ACLs that the change cannot affect in any circumstances. As an example, a modification of an access rule in the policy that is applicable to a particular resource (e.g. in XACML formalism, the resource appears in a Target field of an access rule) may potentially affect the ACL of the resource; whether the list will actually change depends on the substantive content of the access rule, which need not be examined for the purposes of determining the extent of the incremental provisioning. Conversely, if the modified access rule is not applicable to the resource, the ACL of the resource cannot possibly be affected by the change, and can thus be excluded from consideration in the incremental provisioning. Once the scheduler has determined—or has obtained information of the ACLs that are in need of updating—the scheduler initiates partial provisioning of these ACLs.

If the permissions provisioning module is operated in an offline mode, the generated ACLs are stored or transmitted to the computer system, whereas their deployment may be postponed. As used in this disclosure, deployment of an ACL includes storing (and if applicable, authenticating and/or verifying) the ACL in the designated location, from which the access control mechanism retrieves it during operation. In other words, a properly deployed ACL controls the behaviour of the access control mechanism. Postponed deployment has the advantage that the generated ACLs may be subject to auditing before they are deployed and enter into force in the computer system. In this connection, it is an advantage if a generated ACL is provided in its final form rather than being defined, as in some prior art approaches, as a list of instructions for amending the current corresponding ACL into one that agrees with the governing access rules. If such an approach had been relied upon, it would have been necessary to simulate the process of amending the current ACL according to the instructions before the final form of the ACL could be audited.

As an alternative to the offline mode, according to an example embodiment, the permissions provisioning module may optionally initiate deployment of the generated ACLs into the computer system. As an example, the data adapter within the permissions provisioning module may have access rights to replace the ACLs in the locations where they are stored in the computer system. Alternatively, the data adapter may have rights allowing it to modify existing ACLs in order for them to be equivalent to respective generated ACLs. As a further example, the data adapter may deliver the collection of generated ACLs to the computer system with a request to have them deployed, possibly with an indication of the earliest and/or latest time this is to happen.

In a further development of the previous example embodiment, the data adapter may be configured, further, to receive current (i.e. already deployed) ACLs from the computer system. After a new ACL for the resource has been generated, as a result of a round of provisioning, the data adapter compares, for this resource the current and generated ACLs. If the generated ACL is equivalent to the current ACL, the data adapter decides to omit deployment of the generated ACL. In computer systems where deployment of an ACL involves a non-negligible cost in time or processing power due to verification procedures or the like, this example embodiment may contribute to more economical operation and/or less cumbersome interaction between the permissions provisioning module and the computer system. It is appreciated that the comparison between current and generated ACLs may alternatively be performed by batches rather than one list at a time.

In an example embodiment, the way in which the data adapter assigns attribute values on the basis of the system metadata received from the computer system is configurable. For example, the data adapter may accept a mapping table which maps system metadata relating to resources to corresponding resource attributes in the ABAC policy. It is also possible to supply the data adapter with a mapping table relating system metadata for the principals to subject attributes in the ABAC policy. Further still, the data adapter's assignment of action attributes in the policy may be controlled by a mapping table which relates these attributes to system metadata describing functionalities of the resources, including "delete" and operations that are defined for these resources. This example embodiment allows for precise and accurate control of the translation between policy attributes and system metadata.

In an example embodiment, the permissions calculator is configured to query the policy evaluator on combinations of values of resource attributes (for resources), subject attributes (for principals) and environment attributes. More precisely, such combinations of attribute values are submitted as access decision requests. In particular, the environment attribute values may be obtained by a procedure where the data adapter receives environment (meta)data describing a current state of the computer system and assigns values of environment attributes in the ABAC policy. The attribute values thus assigned are made available to the permissions calculator.

In an example embodiment, a parallelized permissions provisioning module is adapted to interact simultaneously with more than one computer system of the type described above. At a general level, the parallelized permissions provisioning module comprises as many data adapters as the maximum number of computer systems with which the module has been designed to interact simultaneously. It is normally sufficient to equip the permissions provisioning module with a single policy evaluator and a single permissions calculator, which are common to all data adapters. Each of the data adapters is functionally similar to the data adapter described above in the context of the non-parallelized permissions provisioning module. In particular, a ($k^{th}$) data adapter is configured to receive the system metadata from a ($k^{th}$) computer system which, for the purposes of operating the permissions provisioning module, has been associated with the data adapter. Furthermore, the ($k^{th}$) data adapter is configured to assign values to the attributes in the ABAC policy that the policy evaluator refers to; the values thus assigned are preferably arranged by resource or by principal, as applicable. Eventually, after supplying the attribute values to the common permissions calculator and receiving permission data in return, the ($k^{th}$) data adapter arranges the permission data by resource and generates ACLs readable by the corresponding ($k^{th}$) computer system and supplies these for deployment in the ($k^{th}$) system. In this example embodiment, the policy evaluator evaluates a single policy which is to apply, through the intermediary of the ACLs to be deployed, in all of the computer systems with which the parallelized permissions provisioning module interacts. In further developments, the policy evaluator may instead be configured to evaluate an access query, in dependence of the origin of the access query, against a specific ABAC policy which is not common to all computer systems with which the parallelized permissions provisioning module interacts. In particular, the data adapter may accept configuration data indicating an ABAC policy, out of a plurality of ABAC policies that the policy evaluator may access, that is to apply in respect of a given ($k^{th}$) computer system. It is understood that the policy evaluator may be implemented in a manner independent of the content of the ABAC policy or ABAC policies that it is configured to evaluate.

In an example embodiment, the permissions provisioning module is configured to retrieve the ABAC policy from a site (repository) to which the computer system lacks access rights, in particular lacks direct access rights. In the permissions provisioning module, it may be sufficient to grant the policy evaluator read rights to the repository storing the ABAC policy. This example embodiment may be said to represent an improved externalization of the access management of the computer system. This may be beneficial to security and reliability.

In an example embodiment, the ABAC policy or policies which the policy evaluator evaluates is encoded using a markup language. Suitable examples include the following: XML; XACML of the latest standardized version released at the original filing date of the present disclosure, or a future version that is backwards compatible with respect to the applicable standardized XACML version; Axiomatics Language for Authorization™ available from the applicant. Policies in one of these markup languages are generally able to express more fine-grained access conditions than ACLs.

In an example embodiment, the permissions provisioning module is an integral component of the computer system. Still, since the access rules specified in the ABAC policy control the content of the ACLs to be provisioned to the computer system, this architecture too represents a case of externalized access management, with the associated benefits.

In an example embodiment within a second aspect of the present invention, there is provided a method of provisioning permissions in a computer system in accordance with an ABAC policy. The method may correspond to the workflow of the permissions provisioning module, as outlined above. The method may involve interaction with a computer system having a plurality of resources and an access control mechanism, as already described in detail, and being operable to supply system metadata including metadata pertaining to resources and metadata pertaining to principals of the system. The system metadata may be supplied in response to a query or a reading performed by an external process or entity, or may be contained in a memory allowing external access. In particular, the method may comprise the following:

system metadata are received;

values are assigned to attributes in the ABAC policy in accordance with the metadata, and the attribute values are arranged resource-wise and principal-wise;

by queries to the ABAC policy, it is established what decision the policy returns for combinations of (attribute values carried by) resources and principals, whereby permission data are obtained;

the permission data are arranged resource-wise and ACLs are generated based thereon, preferably in a system-readable format; and the generated ACLs are supplied for deployment in the computer system.

In a further development, the method may include actually deploying the generated ACLs in the computer system. The deploying may include initiating storage of the generated ACLs in the location(s) designated for this purpose in the computer system, in which the access control mechanism of the system retrieves the ACLs and adapts its behaviour accordingly. This way, the access rules in the ABAC policy will indirectly control, via the generated and deployed ACLs, the access control mechanism of the computer system.

In an example embodiment within a third aspect of the invention, there is provided a computer program product including a transitory or non-transitory computer-readable medium with instructions for performing the method according to the preceding example embodiment.

BRIEF DESCRIPTION OF THE DRAWINGS

Example embodiments will be described in greater detail in what follows, with reference to the accompanying drawings, on which:

FIG. 2 shows an example ACL;

FIG. 4 illustrates key functional components of an ABAC implementation;

FIG. 5 shows a further development of the permissions provisioning module of FIG. 1, according to a further example embodiment, wherein the module is here configured for interaction with two or more computer systems.

Unless otherwise stated, like reference numerals refer to like elements on the drawings.

EXAMPLE EMBODIMENTS

Figure 3:
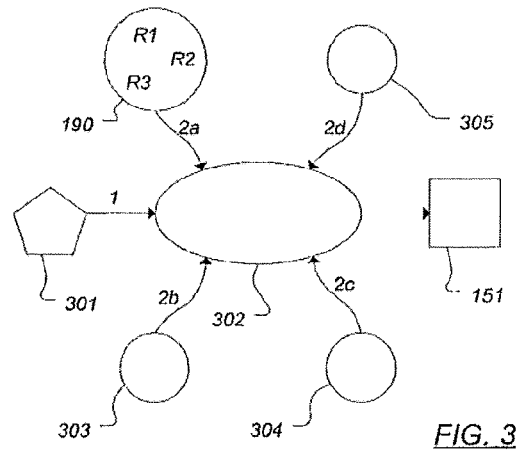
FIG. 3 illustrates an access scenario in accordance with an ABAC authorization model.

FIG. 4 illustrates an example ABAC implementation and possible flows of information when authorization services 401 process a subject's 301 request to access a resource 151 by using or performing an action on the resource 151. The authorization services 401 include a policy enforcement point (PEP) 402, which selectively permits or prevents the subject's 301 access to the resource 151, e.g. by selectively activating and deactivating hardware or software protection means, and a policy decision point (PDP) 403. The access request is to be evaluated against an ABAC policy in a policy repository 190, which may be maintained from a policy administration point (PAP) 404. The PDP 403 may configured to retrieve necessary information describing the ABAC policy from the repository 190. From a policy information point (PIP) 405, the PDP 403 may request any such values of policy attributes that are missing from the initial access request but necessary to evaluate the request against the policy. In turn, the PIP 405 may request these values from an attribute repository 303-304 storing values of subject and resource attributes (in this sense, the repository may be seen as an entity combining the functionalities of the data sources 303 and 304 in FIG. 3 and has been labelled accordingly) and/or from an environment conditions repository 305. The evaluation of the access request may then complete, and a decision may be returned to the subject 301. If the decision is permissive, the PEP 402 grants access to the resource 151, as requested.

Figure 1:
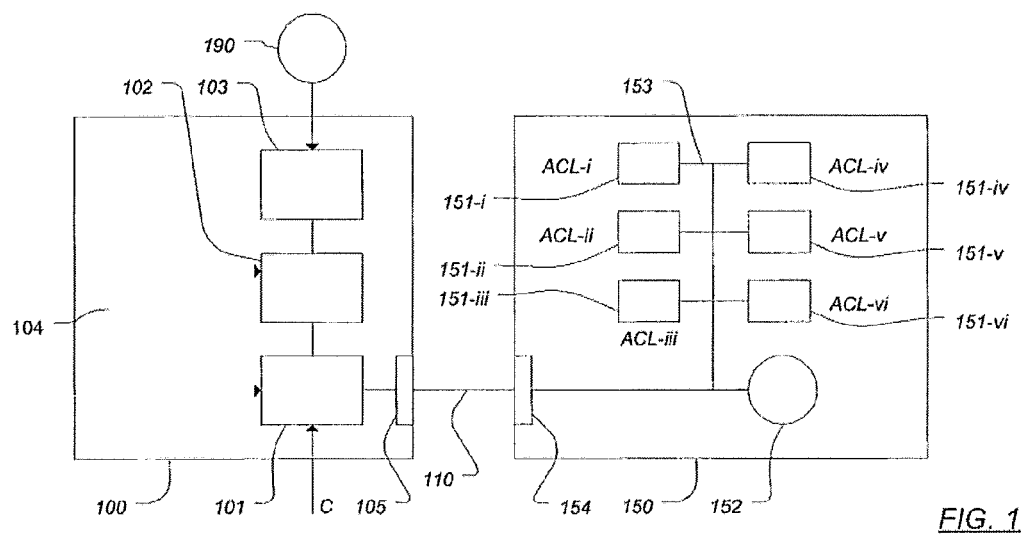
FIG. 1 is a block diagram showing a computer system connected to a permissions provisioning module according to an example embodiment.

FIG. 1 shows a permissions provisioning module 100 according to an example embodiment, and further shows a computer system 150, with which the permissions provisioning module 100 interacts. In FIG. 1, the permissions provisioning module 100 is shown connected to the computer system 150, namely via respective communication interfaces 105, 154 and a communication line 110. It is recalled that connected interaction is but one of the possible implementations of permissions provisioning according to the present invention; alternative implementations include offline interaction, wherein ACLs are generated based on a copy (or snapshot) of relevant system metadata and supplied for deployment at a selectable point in time. In the computer system 150, there are arranged resources 151-$i$, . . . , 151-$vi$ and a memory 152 (schematically shows as a centralized memory) storing system metadata describing resources and principals of the computer system. The resources 151-$i$, . . . , 151-$vi$, memory 152 and communication interface 154 are connected by network infrastructure 153, such as a bus, local area network or wide area network.

An access control mechanism (not shown) is provided in the permissions provisioning module 150. The access control mechanism is configured to restrict access to each of the resources 151-$i$, . . . , 151-$vi$ by controlling corresponding hardware or software protection means (not shown), such means being known per se in the art. For instance, the access control mechanism may process a principal's access request, determine whether it is permissible and, if so, selectively deactivating the protection means. If not, the access control mechanism may ensure that the protection means remains active; optionally, the access control mechanism may inform the principal which requested access that the request was denied. In the depicted computer system 150, the access control mechanism determines whether an access request is to be permitted by comparing the identity of the requesting principal and the principals mentioned in an ACL (denoted ACL-k) associated with the resource 151-$k$ to which the principal requests access.

An example ACL is shown in FIG. 2. Actions defined for the ACL's associated resource are read (r), write (w) and delete (d), and P1, P2, P3, P4, P5 denote the principals mentioned in the ACL. In the example, a combination of a principal and an action may be assigned either of a yes (Y) and no (N) value, respectively corresponding to permitting and denying this action to be performed on the resource, but also a value indicating that the access status is undefined (-). In a simplified embodiment, yes and no are the only allowed values in an ACL. If an ability to assign such undefined access status value is defined, however, it becomes possible to allow one user to belong to several principals, since contradictory access decisions can be reconciled at least in some situations; for instance, a user matching both P2 and P3 requesting write access to the resource will be permitted according to the ACL shown in FIG. 2. The access control mechanism processing, against the same ACL, a request for write access from a user matching P3 only will not be able to reach a decision based on the example ACL; the access control mechanism may then fall back on a default decision or catch-all rule, such as denying access. Alternative ways of avoiding irreconcilable results when evaluating an ACL may be precedence rules such as "deny overrides", "permit overrides" (if the access control mechanism is configured to traverse the entire ACL) or "first applicable" (if the access control mechanism is configured to read the ACL in a top-down fashion, terminating as soon as it has reached any access decision relating to the requesting principal). The latter option is beneficial in that it allows for fast blocking of a particular principal, namely by inserting a top row with negative access values in the relevant ACLs; this causes the access control mechanism to block the principal from accessing the resource, regardless of any lower, possibly permissive entries where the particular principal is present in the ACLs.

Resuming now the description of FIG. 1, the permissions provisioning module 100 comprises a data adapter 101, which is connected to the communication interface 105, and a permissions calculator 102, which is connected both to the data adapter 101 and a policy evaluator 103, which has at least read access rights to a policy repository 190 storing an ABAC policy. The content of the access rules in the ABAC policy controls the content of the ACLs to be generated by the permissions provisioning module 100. There normally cannot be any influence from the ACLs in the computer system 150 to the ABAC policy. In the embodiment shown, no portion of the permissions provisioning module 100 is required to modify or write to the ABAC policy in the policy repository 190.

The permissions provisioning module 100 optionally comprises a scheduler 104 arranged to cause the permissions calculator 102 and/or the data adapter 101, as the case may be, depending on whether one or the other or both has sufficient authority over other components of the permissions provisioning module 100, to initiate a new round of ACL provisioning. Different options for configuring the scheduler 104 have been discussed in detail in preceding sections of this disclosure.

Via the communication interface 105, which may be configured to actively submit queries to computer system 150, the data adapter 101 receives system metadata. Metadata relating to a given resource may be received in a data structure associating it with a resource identifier, such as a uniform resource identifier (URI), or other means for determining the identity of the given resource. Resource metadata entries may be on the generic form: ([resource identifier], [data_type], [data_value]); an example metadata entry on this form is as follows: (file://host1/test.text, filesize, 28805). It is not necessary that all system metadata relating to one resource are received in an uninterrupted sequence. Indeed, by traversing all metadata entries and ordering them by URIs, the data adapter 101 may determine the complete population of resources for which metadata are received and also collect all metadata pertaining to each resource if this is required in the subsequent processing steps. In particular, the data adapter 101 may determine all actions which are defined in respect of a particular resource, such as the actions of reading, modifying and deleting in respect of a document. Similarly to this, metadata relating to a given principal may be annotated with a identity or identifier of the principal, on the generic form: ([principal identifier], [data_type], [data_value]), an example entry being (principal1101, department_name, Finances). The data adapter 101 may proceed similarly with principal metadata in order to determine the population of principals that are to be appear in the generated ACLs. The data adapter 101 may be further configured to handle metadata entries describing a state of the computer system 150, which carry neither a resource identifier nor a principal identifier.

The data adapter 101 then goes on to translate the system metadata into values of those attributes in which the ABAC policy has been formulated. The translation may proceed in accordance with configuration data C including one or more of: a mapping table $M_P$ between principal metadata and subject attributes; a mapping table $M_R$ between resource metadata and resource attributes; a mapping table $M_A$ between resource metadata expressing functionalities of the resources and action attributes. The data adapter 101 is configured to match an incoming system metadata type to an entry in any of these mapping tables, and then select an attribute, to which a value is to be assigned, accordingly. The precise control over the attribute value assignment that the configuration data C offers makes it possible to reconcile inconsistencies between metadata nomenclature and policy nomenclature, which may typically arise if the ABAC policy and the system metadata structures have been designed by different entities. If the ABAC policy agrees well with the naming of the system metadata, there is no imperative to control the attribute value assignment process by feeding configuration data to the data adapter 101. If the data adapter 101 further handles metadata describing a state of the computer system 150, it translates these into values of environment attributes, which by their nature apply to all subjects, resources and actions at the moment of policy evaluation.

From the data adapter 101, the permissions calculator 102 receives values of the system metadata arranged by resource and by principal, and may additionally receive lists of resources, principals, actions on resources and, if applicable, current values of environment attributes. The permissions calculator 102 evaluates the ABAC policy for each combination of a resource and a principal. If more than one action is defined in respect of a resource, the permissions calculator 102 evaluates the ABAC policy for each combination of a resource, a principal and an action.

The evaluation is performed by the policy evaluator 103, which forms, for each such combination, an access request with the attribute values of the resource, of the principal and optionally values of action and environment attributes, and evaluates this against the ABAC policy. The policy evaluator 103 may be implemented in a similar fashion as the PDP outlined above. The result of the evaluation process (permission data) may be expressed as an access matrix, the entries in which are chosen from the possible access decisions Permit, Deny or Undefined, wherein the Undefined decision may have sub-values such as NotApplicable (indicating that the ABAC policy is not concerned with this combination) or Indeterminate (indicating that the ABAC policy may provide a decision for this combination but the set of attribute values is not sufficient to complete the evaluation). As an example, an access rule in the ABAC policy may stipulate that any principal shall be granted access to send print jobs to a network printer only if the principal is logged in from an access point in the same office location as where the printer is installed. The location of the principal may be expressed as a subject attribute, the location of the printer as a resource attribute and the act of sending a print job as an action attribute. An access request carrying these attribute values will evaluate to either of the decisions Permit and Deny. If no value has been assigned to the attribute expressing the location of the principal, e.g. because the login details could not be determined, the policy evaluation may return Indeterminate. The permissions calculator 102 may then rely on a catch-all rule stipulating that an undefined-type policy decisions is to be translated into no access right (N) or undefined access right (-) in the ACL to be generated.

The permissions calculator 102 may effectuate the evaluation continuously in accordance with the current availability of attribute values. Alternatively, the permissions calculator 102 may evaluate all combinations involving a given resource sequentially, so that all permission data pertaining to the given resource will be ready after this point; this is beneficial since the data adapter 101 further downstream in the processing chain will collect the permission data resource-wise and convert it into system-readable ACL format. Alternatively, the permissions calculator 102 may be configured to wait until the totality of the attribute values has been received and then organize the evaluation in a computationally economical fashion; an efficient method complete evaluation of an ABAC policy is disclosed in the applicant's patent EP2681690.

A further way of conducting the evaluation against the ABAC policy is by way of reverse access queries. It is recalled that a reverse query includes a sought-for access decision together with a non-complete attribute value collection (i.e. insufficient to complete the evaluation against the policy), and having as its expected response those values, if any, of the remaining attributes that would yield the sought-for access decision. An efficient method for evaluating a reverse query is disclosed in the applicant's application WO2012091653. For example, in response to a reverse query, the policy evaluator 103 may return attributes values indicating all actions that a principal is permitted to perform in respect of a resource. As a further example, a reverse query may return attribute values characterizing all principals that are permitted to perform a given action in respect of a resource. In certain circumstances, and depending on the complexity of the policy evaluator's 103 algorithms for evaluating reverse queries, this approach to completely evaluating the ABAC policy may turn out to be more economical than if normal access requests are used.

The permissions calculator 102 may be configured to return the permission data to the data adapter 101 in the form of an access matrix. In the case of continuous evaluation, it may be preferable to convey all permission data for one resource at a time (i.e. notionally transmitting the access matrix one row or one column at a time) as soon as they are complete. This way of conveying the permission data may lead to fewer occasions on which the data adapter maintains a large number of partial sets of permission data and waits for these to complete in order to generate a next ACL. The generating of ACLs in the data adapter 101 may include a reverse translation, namely, one from values of ABAC policy attributes into identities of principals and resources, respectively, as well as actions defined in respect of the resources. The ACLs are system-readable. Each generated ACL may be expressed in a self-consistent form, allowing it to be evaluated in arbitrary order. In further developments, the data adapter 101 may include optimization functionalities allowing given permission data for a resource to be expressed in reduced form made possible by knowledge of a precedence rule that the access control mechanism of the computer system 150 applies, such as "first applicable" if the ACLs are read in a top-down fashion. It is recalled in this connection that the most generic embodiments of the invention are intended to optimize the way the principals are defined.

In the example embodiment depicted in FIG. 1, the communication interface 105 may be configured to transmit the ACLs to the computer system 150 at the pace they are generated. Alternatively, the ACLs may be temporarily stored in the data adapter 101 or the communication interface 105 until the collection is complete. In this connection, a complete set of ACLs may correspond to one ACL for each resource in the computer system.

As outlined above, the data adapter 101 may further be configured to receive current (deployed) ACLs from the computer system 150 and compare these with the generated ACLs. If a current ACL is identical or at least equivalent to a generated ACL, the effort of deploying the generated ACL can be saved.

Figure 6:
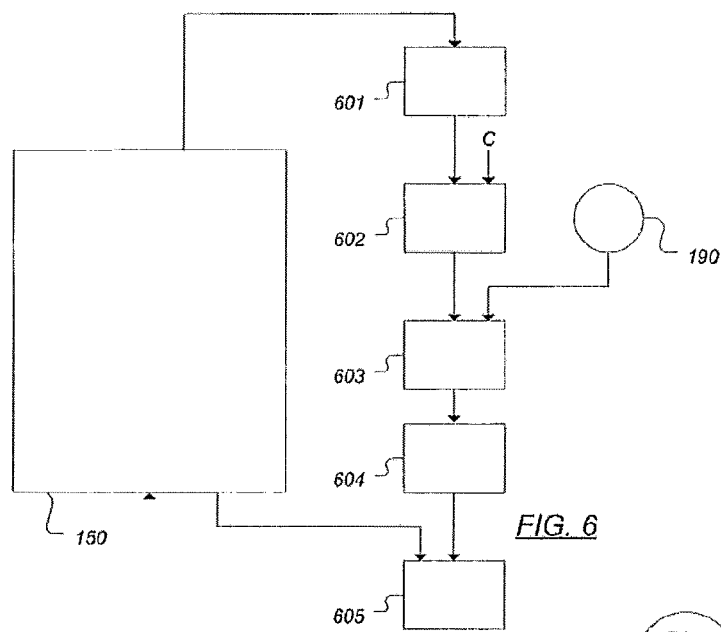
FIG. 6 is a generalized flowchart of a permissions provisioning method in accordance with an example embodiment.

It is instructive to describe the actions executed in the permissions provisioning module 100 once more while referring to the flowchart in FIG. 6. The flowchart depicts actions 601-605 but also some of the data source they rely upon, including the computer system 150, from which system metadata and current ACLs are obtained, the configuration data C governing the translation from system metadata to values of policy attributes, and the policy repository 190 where the ABAC policy is accessed. In a first step 601, system metadata are received. In a second step 602, values are assigned to attributes in the ABAC policy based on the metadata and in accordance with configuration data C, and the attribute values are arranged resource-wise and principal-wise. In third step 603, by evaluating queries against the ABAC policy in the repository 190, it is established what decision the policy returns for combinations of (attribute values carried by) resources and principals, and optionally values of action attributes and environment attributes. This way, permission data are obtained. In a fourth step 604, the permission data are arranged resource-wise and ACLs are generated based thereon, preferably in a system-readable format. In a fifth step 605, the generated ACLs are compared with the current ACLs, and selected ACLs, viz. those which are found to have changed, are supplied for deployment in the computer system 150, as the dashed arrow indicates.

As a further development of the example embodiment shown in FIG. 1, a parallelized permissions provisioning module 500 for simultaneously interacting with a plurality of computer systems 150-1, . . . , 150-4 is schematically depicted in FIG. 5. By way of example, the module 500 is shown in a state where it communicates with four computer systems 150-1, . . . , 150-4. As already outlined in preceding sections of this disclosure, a preferred way of implementing the parallelized permissions provisioning module 500 includes duplicating the data adapter to a number of data adapters 101-1, . . . , 101-4 corresponding to the maximal number of simultaneously interacting computer systems 150. Each data adapter 101-$k$ is accepts configuration data Ck governing the way it assigns attribute values in dependence with the system metadata it receives from an associated computer system 150-$k$; this allows for a high degree of adaptability. As also suggested in FIG. 5, the communication interface in the basic permissions provisioning module 100 has been duplicated, so that each data adapter 101-$k$ communicates with the associated computer system 150-$k$, including receiving system metadata and supplying generated ACLs, over a communication interface 105-$k$ of its own. As mentioned above, the policy repository 190, from which the common policy evaluator 103 retrieves policy description data, may store more than one independent ABAC policy. This way, the parallelized permissions provisioning module 500 may be operated for parallel implementation of plural ABAC policies in plural computer systems 150-1, . . . , 150-4, namely in the form of ACLs to be deployed in these systems.

Even though the present disclosure describes and depicts specific example embodiments, the invention is not restricted to these specific examples. Modifications and variations to the above example embodiments can be made without departing from the scope of the invention, which is defined by the accompanying claims only.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs appearing in the claims are not to be understood as limiting their scope.

The devices and methods disclosed above may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out in a distributed fashion, by several physical components in cooperation. Certain components or all components may be implemented as software executed by a digital processor, signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

The invention claimed is:

1. A permissions provisioning module adapted to interact with a computer system, which comprises:
   a plurality of resources, each resource being associated with an access control list (ACL) indicating permissions in respect of the resource;
   memory storing system metadata including metadata associated with the resources or metadata associated with principals of the system or both;
   an access control mechanism configured to selectively restrict principals' access to a resource in accordance with its associated ACL, wherein the access control mechanism of the computer system operates outside direct influence of the ABAC policy; and
   a processor configured to perform the functions of:
   a policy evaluator configured to evaluate an access query against an attribute-based access control (ABAC) policy, which is retrievable by the policy evaluator and includes access rules expressed in terms of attributes;
   a data adapter configured to receive the system metadata and assign values to said attributes in the ABAC policy in accordance with the metadata, the attribute values being arranged resource-wise and principal-wise; and
   a permissions calculator configured to query the policy evaluator on combinations of resources and principals using the attribute values assigned by the data adapter, and to supply resulting permission data to the data adapter,
   wherein the data adapter is configured to arrange said permission data resource-wise, generate system-readable ACLs based thereon, supply the generated ACLs for deployment in the system, receive current ACLs, compare, for a given resource, a current ACL and a generated ACL, omit deployment of the generated ACL if it is equivalent to the current ACL, receive environment data related to a current state of the computer system, and assign values of environment attributes in the ABAC policy which it supplies to the permissions calculator.

2. The permissions provisioning module of claim 1, further comprising a scheduler, wherein the data adapter or the permissions calculator or both are controllable by the scheduler, said scheduler being operable to initiate a complete or partial provisioning of ACLs for all system resources.

3. The permissions provisioning module of claim 2, wherein the scheduler is event-driven.

4. The permissions provisioning module of claim 2, wherein the scheduler is calendar-driven.

5. The permissions provisioning module of claim 2, wherein the scheduler is operable to initiate incremental provisioning, which is restricted to such ACLs that are affected by a change in the system metadata or a change in the ABAC policy or both.

6. The permissions provisioning module of claim 1, wherein the data adapter is further configured to deploy the generated ACLs in the system.

7. The permissions provisioning module of claim 1, wherein the data adapter accepts configuration data and assigns said attribute values in accordance with this, the configuration data being at least one of:
   a mapping table relating resource metadata to resource attributes in the ABAC policy;
   a mapping table relating principal metadata to subject attributes in the ABAC policy;
   a mapping table relating such resource metadata that express functionalities of the resources to action attributes in the ABAC policy.

8. The permissions provisioning module of claim 1, wherein the permissions calculator is configured to query the policy evaluator on combinations of resources, principals and values of environment attributes.

9. The permissions provisioning module of claim 1, adapted to interact with a plurality of computer systems, each comprising:
   a plurality of resources, each resource being associated with an access control list (ACL) indicating permissions in respect of the resource;
   memory storing system metadata including metadata associated with the resources or metadata or both associated with principals of the system; and
   an access control mechanism configured to selectively restrict principals' access to a resource in accordance with its associated ACL,
   the permissions provisioning module comprising:
   the policy evaluator;
   a plurality of data adapters, each configured to receive the system metadata from a system out of said plurality of computer systems and assign values to the attributes in the ABAC policy in accordance with the metadata, the attribute values being arranged resource-wise and principal-wise; and
   the permissions calculator, which is communicatively connected to the policy evaluator and each data adapter, and configured to query the policy evaluator on combinations of resources and principals within each system out of said plurality of computer systems, and supply resulting permission data to the corresponding data adapter,
   wherein a data adapter is configured, upon receipt of said permission data, to arrange the permission data resource-wise, generate system-readable ACLs based thereon and supply the generated ACLs for deployment in the corresponding system.

10. The permissions provisioning module of claim 1, configured to retrieve the ABAC policy from a site to which the computer system lacks direct access rights.

11. The permissions provisioning module of claim 1, wherein the resources in the computer system are one or more of the following:
   devices, files, records, tables, processes, programs, networks, domains containing or receiving information.

12. A method of provisioning permissions in a computer system in accordance with an attribute-based access control (ABAC) policy, which includes access rules expressed in terms of attributes, the computer system comprising:
a plurality of resources, each resource being associated with an access control list (ACL) indicating permissions held by principals of the system in respect of the resource; and
an access control mechanism configured to selectively restrict principals' access to a resource in accordance with its associated ACL, wherein the access control mechanism of the computer system operates outside direct influence of the ABAC policy,
wherein the system is operable to supply system metadata including metadata associated with the resources or metadata associated with principals of the system or both,
the method comprising:
receiving the system metadata;
assigning values to said attributes in the ABAC policy in accordance with the metadata, the attribute values being arranged resource-wise and principal-wise;
querying the ABAC policy on combinations of resources and principals using the attribute values assigned by the data adapter, whereby permission data result;
arranging said permission data resource-wise and generating system-readable ACLs based thereon;
supplying the generated ACLs for deployment in the system;
receiving current ACLs;
comparing, for a given resource, a current ACL and a generated ACL;
omitting deployment of the generated ACL if it is equivalent to the current ACL;
receiving environment data related to a current state of the computer system; and
assigning values of environment attributes in the ABAC policy which it supplies to the permissions calculator.

13. A computer program product comprising a non-transitory computer-readable medium with computer-readable instructions to be executed by a permissions provisioning module adapted to interact with a computer system in accordance with an attribute-based access control (ABAC) policy, which includes access rules expressed in terms of attributes,
the computer system comprising:
a plurality of resources, each resource being associated with an access control list (ACL) indicating permissions held by principals of the system in respect of the resource; and
an access control mechanism configured to selectively restrict principals' access to a resource in accordance with its associated ACL, wherein the access control mechanism of the computer system operates outside direct influence of the ABAC policy,
wherein the system is operable to supply system metadata including metadata associated with the resources or metadata associated with principals of the system or both,
the computer program product comprising instructions for:
receiving the system metadata;
assigning values to said attributes in the ABAC policy in accordance with the metadata, the attribute values being arranged resource-wise and principal-wise;
querying the ABAC policy on combinations of resources and principals using the attribute values assigned by the data adapter, whereby permission data result;
arranging said permission data resource-wise and generating system-readable ACLs based thereon;
supplying the generated ACLs for deployment in the system;
receiving current ACLs;
comparing, for a given resource, a current ACL and a generated ACL;
omitting deployment of the generated ACL if it is equivalent to the current ACL;
receiving environment data related to a current state of the computer system; and
assigning values of environment attributes in the ABAC policy which it supplies to the permissions calculator.

* * * * *